US010367870B2

(12) United States Patent
Pevzner

(10) Patent No.: US 10,367,870 B2
(45) Date of Patent: Jul. 30, 2019

(54) CONFERENCING SYSTEM AND METHOD IMPLEMENTING VIDEO QUASI-MUTING

(71) Applicant: RingCentral, Inc., Belmont, CA (US)

(72) Inventor: Dmitry Yakovlevich Pevzner, Saint-Petersburg (RU)

(73) Assignee: RingCentral, Inc., Belmont, CA (US)

( * ) Notice: Subject to any disclaimer, the term of this patent is extended or adjusted under 35 U.S.C. 154(b) by 70 days.

(21) Appl. No.: 15/334,845

(22) Filed: Oct. 26, 2016

(65) Prior Publication Data
US 2017/0374118 A1 Dec. 28, 2017

Related U.S. Application Data

(63) Continuation of application No. PCT/RU2016/000385, filed on Jun. 23, 2016.

(51) Int. Cl.
*H04L 29/06* (2006.01)
*G06F 3/16* (2006.01)
*H04N 7/15* (2006.01)

(52) U.S. Cl.
CPC ........ *H04L 65/4092* (2013.01); *H04L 65/403* (2013.01); *H04L 65/601* (2013.01); *H04L 65/607* (2013.01); *H04N 7/15* (2013.01)

(58) Field of Classification Search
USPC ................................. 709/205, 219, 246, 220
See application file for complete search history.

(56) References Cited

U.S. PATENT DOCUMENTS

| 7,423,214 | B2 * | 9/2008 | Reynolds | G09B 15/00 |
| | | | | 84/612 |
| 7,571,212 | B2 * | 8/2009 | Reynolds | G06Q 10/10 |
| | | | | 709/206 |
| 7,876,996 | B1 * | 1/2011 | Herz | H04N 5/76 |
| | | | | 386/203 |
| 9,041,766 | B1 * | 5/2015 | Gates | H04N 7/15 |
| | | | | 348/14.08 |
| 9,154,845 | B1 * | 10/2015 | Abboa-Offei | H04N 21/4788 |
| 9,232,190 | B1 * | 1/2016 | Vendrow | H04L 12/1831 |
| 9,692,831 | B1 * | 6/2017 | Manber | H04L 67/143 |
| 9,706,166 | B1 * | 7/2017 | Bakshi | H04N 7/15 |
| 2005/0166230 | A1 * | 7/2005 | Gaydou | G11B 27/034 |
| | | | | 725/41 |

(Continued)

FOREIGN PATENT DOCUMENTS

WO    WO 2015/001492    1/2015

OTHER PUBLICATIONS

International Search Report and Written Opinion of Application No. PCT/RU2016/000385 dated Nov. 3, 2016 (6 pages).

*Primary Examiner* — Jude Jean Gilles
(74) *Attorney, Agent, or Firm* — Finnegan, Henderson, Farabow, Garrett & Dunner LLP

(57) ABSTRACT

A first communication is provided for use in a video conference session with a second communication portal via a network. The first communication portal may be configured to transmit live video stream of a participant through the second communication portal for presentation on a display thereof, and to a receive control instruction the participant to stop transmitting live video stream. The first communication portal may also be configured to selectively transmit a video clip showing the participant for playback on the display based on the received control instruction.

20 Claims, 4 Drawing Sheets

(56) References Cited

U.S. PATENT DOCUMENTS

| | | | |
|---|---|---|---|
| 2008/0267578 A1 | 10/2008 | Zhang et al. | |
| 2009/0060157 A1* | 3/2009 | Kim | H04L 12/1827 379/202.01 |
| 2009/0150151 A1* | 6/2009 | Sakuraba | G10L 21/028 704/246 |
| 2009/0198580 A1* | 8/2009 | Broberg | G06Q 30/02 705/14.1 |
| 2012/0263089 A1* | 10/2012 | Gupta | H04W 72/005 370/312 |
| 2013/0201277 A1 | 8/2013 | Silva | |
| 2016/0212370 A1* | 7/2016 | Lee | H04N 5/44591 |
| 2017/0199886 A1* | 7/2017 | Perrine | G06F 16/9537 |
| 2017/0358322 A1* | 12/2017 | Wiklof | G11B 27/005 |
| 2017/0374121 A1* | 12/2017 | Phillips | H04N 21/2402 |

\* cited by examiner

CONFERENCING SYSTEM AND METHOD IMPLEMENTING VIDEO QUASI-MUTING

TECHNICAL FIELD

The present disclosure relates to the field of communication systems and, more particularly, to conferencing systems and methods that implement video quasi-muting.

BACKGROUND

A video conference session is a way for physically separated participants to electronically communicate with each other using both audio and video. Each participant of a particular video conference session can hear, view, and provide audio and/or video to other participants of the same conference session in real time by way of a telecommunication portal (e.g., a desk top computer, a laptop computer, a videophone, a handheld device such as a smart phone or tablet, etc.). Some participants may actively participate in the conference session by contributing to a conversation, while other participants may passively participate by only viewing and/or listening to the conversation.

During a video conference session, a situation may arise where a participant that is only passively participating (e.g., not actively contributing to a conversation of the session) does not want to be heard and/or seen by other participants of the conference session. For example, the passive participant may need to perform a task unrelated to the conference session (e.g., answer a phone call or compose an email) or to momentarily leave the conference session. At the same time, the passive participant may not wish to disrupt the conference session with performance of the task or with an interruption in video signal associated with the exodus. Although some video conferencing systems may allow the passive participant to mute audio recording of themselves (e.g., when the passive participant activates an audio-mute feature), a video signal of the passive participant is nevertheless presented to the other conference participants.

Recently, video conferencing technology has been developed that allows for virtual muting of video signals from the passive participant. In particular, when the passive participant activates a corresponding mute feature, virtual video is transmitted from a server to the screens of the other participants in the conference session, instead of live video. The virtual video includes video clips of the passive participant that were previously recorded and stored on the server. The virtual video continually transitions between video clips so as to avoid repeating the same short video clip. An indication of the virtual muting being active is shown to the passive participant, making the passive participant aware of the activated status of the feature.

Although current video conferencing technology may allow for virtual muting of video signals from a passive participant, the technology may still be less than optimal. For example, continuous transmission of the virtual video from the server may require significant network bandwidth. In addition, a weak network signal could cause interruptions in the transmission of the virtual video.

SUMMARY

In one disclosed embodiment, a first communication portal is disclosed for use in a video conference with a second communication portal via a network. The first communication portal may be configured to transmit live video stream of a participant through the second communication portal for presentation on a display thereof, and to receive a control instruction from the participant to stop transmitting live video stream. The first communication portal may also be configured to selectively transmit a video clip showing the participant for playback on the display based on the received control instruction.

In another disclosed embodiment, a computer-implemented method for managing a video conference session is disclosed. The computer-implemented method may include transmitting live video stream of a participant through a communication portal for presentation on a display. The computer implemented method may also include receiving a control instruction from the participant to stop transmitting live video stream, and selectively sending a video clip showing the participant for playback on the display based on the control instruction.

In yet another disclosed embodiment, a non-transitory computer-readable medium is provided. The computer-readable medium is encoded with instructions, which when executed by a processor, cause the processor to perform a method for managing a video conference session. The method may include transmitting live video stream of a participant through a communication portal for presentation on a display. The method may also include receiving a control instruction from the participant to stop transmitting live video stream, and selectively sending a video clip showing the participant for playback on the display based on the control instruction.

BRIEF DESCRIPTION OF THE DRAWINGS

The accompanying drawings, which are incorporated in and constitute part of this disclosure, together with the description, illustrate and serve to explain the principles of various example embodiments.

DETAILED DESCRIPTION

Embodiments of the present disclosure provide a video conferencing system. Video conferencing involves the sharing of audio and video signals between remotely located participants and associated communication portals. Audio and video of each conference participant may be captured by the disclosed system, and streamed live to communication portals of the other participants of the same conference session. As will be described in more detail below, when a particular participant desires live video of themselves to no longer be streamed to the portals of the other participants, a previously recorded video clip of the particular participant may be provided for replay by the communication portals of the other participants in place of the live video. During video clip replay, audio of the particular participant may be muted. For the purposes of this disclosure, the stopping of the live video streaming, coupled with the playback of the video clip at the portals of the other participants, may be considered "quasi-muting" of the video.

Consistent with disclosed embodiments, computer-implemented methods for managing a video conference session are also provided. As will be described in more detail below, the computer-implemented methods can be executed, for example, in desktop and/or mobile environments. In these environments, the disclosed methods may be implemented as stand-alone applications and/or software, or within a web browser (e.g., a WebRTC-based environment). The disclosed methods may provide for muting of audio and quasi-muting of video with reduced network loading, signal interference, and delay.

Reference will now be made in detail to example embodiments of the present disclosure, which are illustrated in the accompanying drawings. Wherever possible, the same reference numbers will be used throughout the drawings to refer to the same or like parts.

Figure 1:
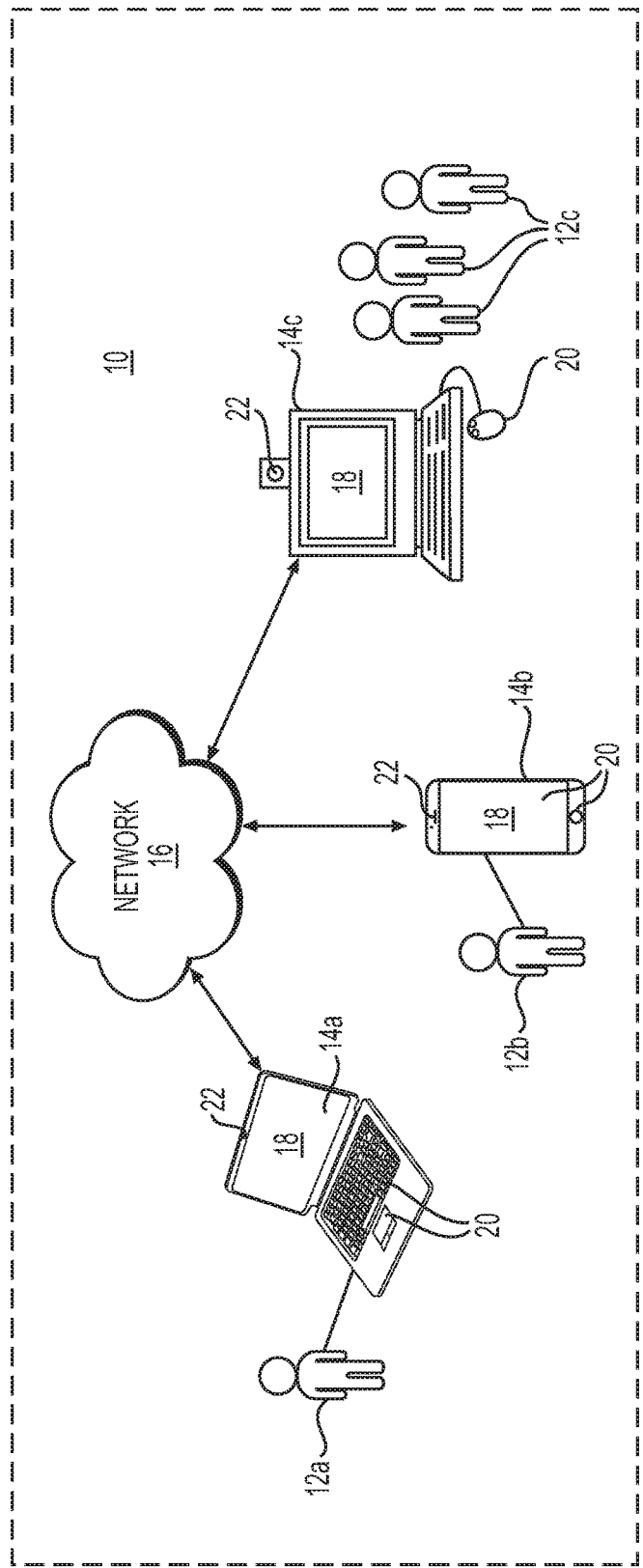
FIG. 1 is a diagram of an example video conferencing system, in which various implementations described herein may be practiced.

FIG. 1 shows an example conferencing system 10, in which various implementations described herein may be practiced. Conferencing system 10 represents, for example, a collaborative environment that allows remotely located participants 12 (e.g., a first participant 12b, a second participant 12b, and a group of participants 12c) to engage in real-time audio and video sharing via any number of separate communication portals 14 (e.g., a first portal 14a, a second portal 14b, and a third portal 14c). Communication portals 14 may be connected to each other, for example, by way of a network 16. It is also contemplated that communication portals 14 could alternatively be connected to each other by way of a peer-to-peer connection, if available.

Figure 2:
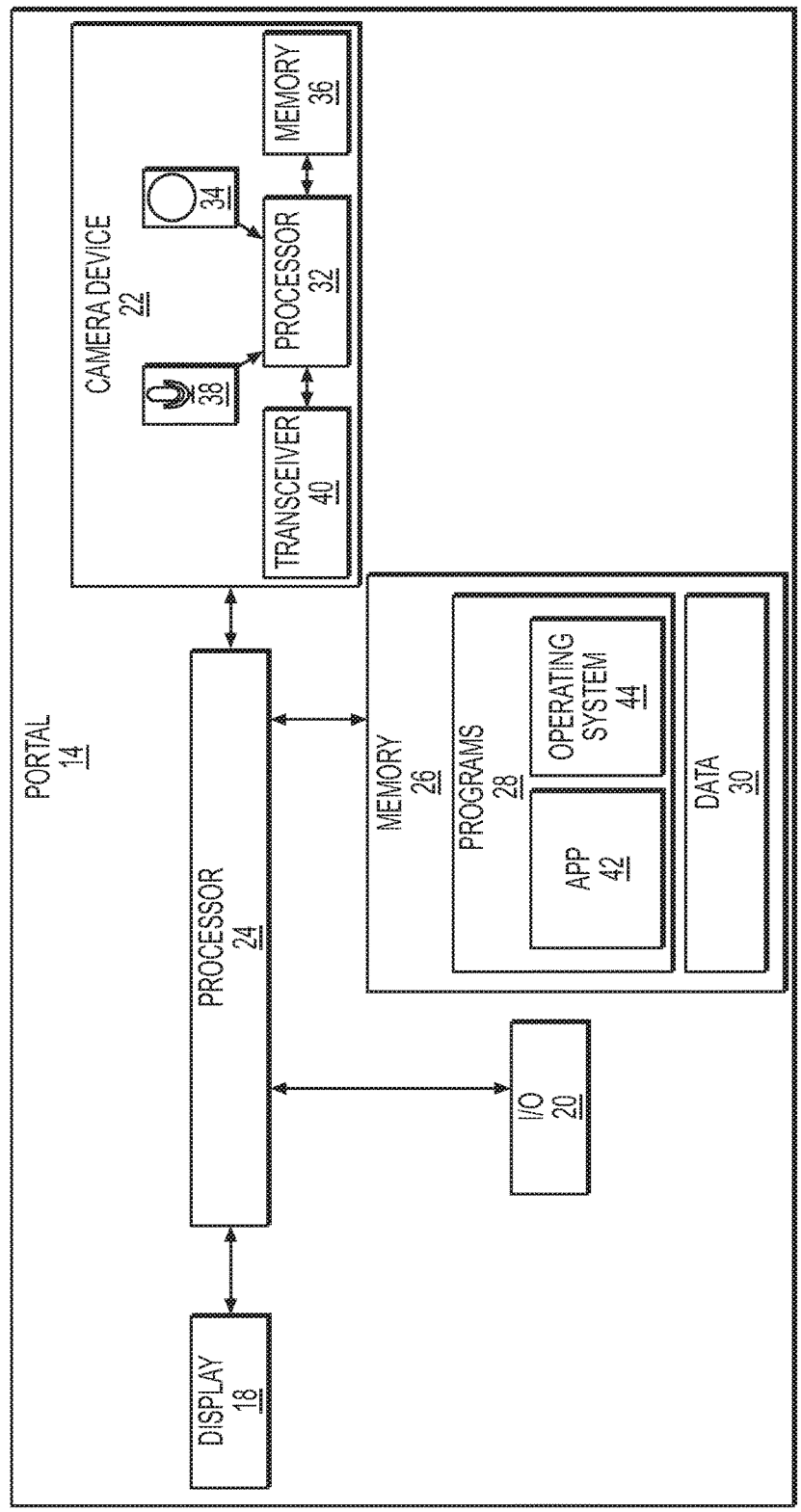
FIG. 2 is a diagram of an example video conferencing portal that may be used in conjunction with the video conferencing system of FIG. 1.

Each portal 14 may be an electronic device having data entry, data transmission, and/or data display capabilities. In some embodiments, one or more of portals 14 are mobile computing devices such as a smart phone, a tablet, a Personal Digital Assistant (PDAs), a laptop or notebook computer, a gaming console, a drone, or any combination of these devices. In other embodiments, one or more of portals 14 is a stationary device such as a desktop computer or a conferencing console. As shown in the example component diagram of FIG. 2, portal 14 may include a display 18, any number of input/output ("I/O") devices 20, one or more camera devices 22, one or more single- or multi-core processors 24, and a memory 26 having stored thereon one or more programs 28 and data 30.

Display 18 may include a liquid crystal display (LCD), a light emitting diode (LED) screen, an organic light emitting diode (OLED) screen, and/or another known display device. Display 18 may be used for the rendering of video signals, graphics, and text under the control of processor 32.

I/O devices 20 may be configured to send and receive information. I/O devices 20 may include, for example, a keyboard, buttons, switches, a touchscreen panel (e.g., a panel integrated with display 18), and/or a speaker (e.g., a speaker integrated with display 18). I/O devices 20 may also include one or more communication modules (not shown) for sending information to and receiving information from other components of system 10 by, for example, establishing wired or wireless connectivity between portals 14 and network 20 (referring to FIG. 1).

Camera device 22 may be a standalone device or a device that is embedded within portal 14. As shown in the example embodiment of FIG. 2, camera device 22 can include one or more processors 32, one or more cameras (e.g., cameras that capture different angles of a participant) 34, a memory 36, a microphone 38, and a transceiver 40. It is contemplated that camera device 22 can include additional or fewer components, depending on the type of portal 14.

Processor 32 of camera device 22 may be configured with virtual processing technologies, and use logic to simultaneously execute and control any number of operations. Processor 32 may be configured to implement virtual machine or other known technologies to execute, control, run, manipulate, and store any number of software modules, applications, programs, etc. In some embodiments, processor 32 can be configured to execute instructions to receive commands from processor 24 associated with video data capture and/or transmission. It is contemplated that, in some embodiments, processor 32 may be omitted and the functions described above alternatively performed directly by processor 24, if desired.

Camera 34 may include one or more sensors for converting optical images to digital still image and/or video data. The one or more image sensors can include known sensors such as semiconductor charge-coupled devices (CCD), complementary metal-oxide-semiconductor (CMOS) devices, and other devices capable of providing image data to processor 32.

Memory 36 can be a volatile or non-volatile, magnetic, semiconductor, tape, optical, removable, non-removable, or other type of storage device or tangible (i.e., non-transitory) computer-readable medium that stores computer executable code such as firmware that causes processor 32 to perform one or more functions associated with image capture, data processing, data storage, data transmitting via transceiver 40, and data receiving via transceiver 40. In some embodiments, memory 36 can include one or more buffers for temporarily storing image data received from camera 34, before transmitting the image data as a camera feed to processor 24.

Microphone 38 can include one or more sensor for converting acoustic waves proximate to camera device 22 to a stream of digital audio data. In some embodiments, camera device 22 transmits a camera feed to processor 24, including video image data and/or audio data.

Transceiver 40 may include a wired or wireless communication module capable of sending and receiving data via network 20, a local network, and/or another direct communication link with one or more components in system 10. In some embodiments, transceiver 40 can receive data from processor 24, including instructions for processor 32 to activate camera 34 and capture video/audio data and for processor 32 to transmit a camera feed via transceiver 40. In response to the received instructions, transceiver 40 can packetize and transmit camera feed, including audio and/or video image data to processor 24 and/or directly to network 20.

Processor 24 can include one or more processing devices configured to perform functions of the disclosed methods. Processor 24 can constitute a single core or multiple core processors executing parallel processes simultaneously. For example, processor 24 can be a single core processor configured with virtual processing technologies. In certain embodiments, processor 24 uses logical processors to simultaneously execute and control multiple processes. Processor 24 can implement virtual machine technologies, or other known technologies to provide the ability to execute, control, run, manipulate, store, etc. multiple software processes, applications, programs, etc. In another embodiment, processor 24 includes a multiple-core processor arrangement (e.g., dual, quad core, etc.) configured to provide parallel processing functionalities to allow portal 14 to execute multiple processes simultaneously. As discussed in further detail below, processor 24 is specially configured with one or more applications and/or algorithms for performing method steps and functions of the disclosed embodiments. For example, processor 24 (and portal 14) can be configured with hardware and/or software components that enable processor 24 to receive real-time camera feed, record video clips, receive control instructions regarding audio muting and/or video quasi-muting, and selectively transmit to other portals 14 associated with a video conference session the real-time camera feed or the video clip based on the control instructions. It is appreciated that other types of processor arrangements could be implemented that provide for the capabilities disclosed herein.

Memory 34 may include a volatile or non-volatile, magnetic, semiconductor, tape, optical, removable, non-removable, or other type of storage device or tangible and/or non-transitory computer-readable medium that stores one or more executable programs 36, such as a video conferencing app 42 and data 30. Data 30 can include, for example, information that is personal to the operator of portal 14, account information, settings, and preferences.

In some embodiments, programs 28 include an operating system 44 that performs known functions when executed by processor 24. By way of example, the operating system may include Microsoft Windows™, Unix™, Linux™, Apple™ operating systems, Personal Digital Assistant (PDA) type operating systems, such as Microsoft CE™, or another type of operating system. Portal 14 may also include communication software that, when executed by processor 24, provides communications with network 20 (referring to FIG. 1), such as Web browser software, tablet, or smart hand held device networking software, etc.

Video conferencing app 42 may cause portal 14 to perform processes related to generating, transmitting, storing, and receiving audio and/or video in association with other participants of a video conference session. For example, video conferencing app 42 may be able to configure portal 14 to perform operations including: capturing a real-time (e.g., live) video stream, recording a video clip, displaying a graphical user interface (GUI) for receiving control instructions, receiving control instructions from the associated participant via I/O devices 20 and/or the user interface, processing the control instructions, sending the real-time video and/or video clips based on the control instructions, receiving real-time video and/or video clips from other portals 14, and streaming the real-time video or playing back the video clips, animations, and/or still images.

Network 16 may include, alone or in any suitable combination, a telephone-based network (such as a PBX or POTS), a local area network (LAN), a wide area network (WAN), a dedicated intranet, and/or the Internet. Further, the network architecture may include any suitable combination of wired and/or wireless components. For example, the communication links may include non-proprietary links and protocols, or proprietary links and protocols based on known industry standards, such as J1939, RS-232, RP122, RS-422, RS-485, MODBUS, CAN, SAEJ1587, Bluetooth, the Internet, an intranet, 802.11 (b, g, n, ac, or ad), or any other communication links and/or protocols known in the art.

Figure 3:
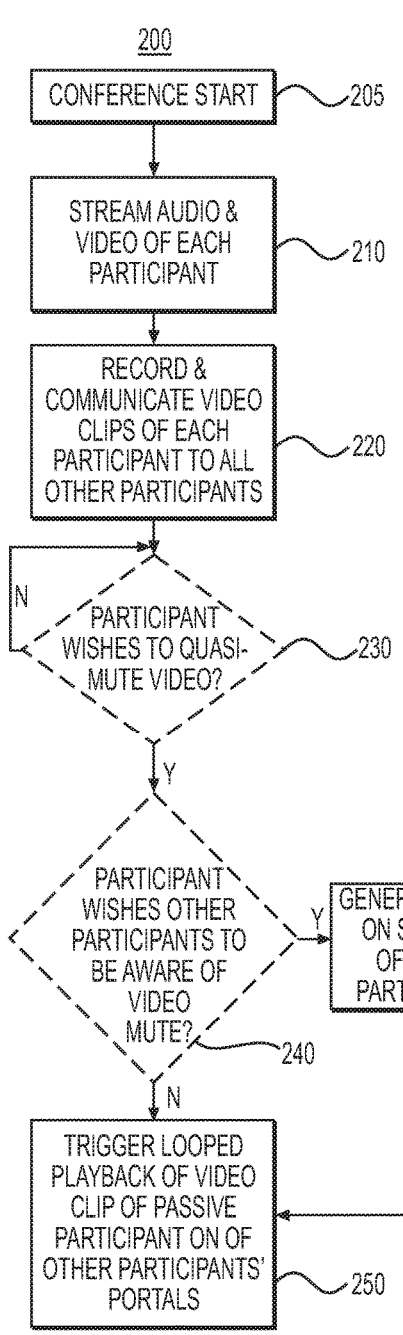
FIGS. 3 and 4 are flowcharts of example processes for managing video conference sessions, in accordance with embodiments of the present disclosure.
Figure 4:
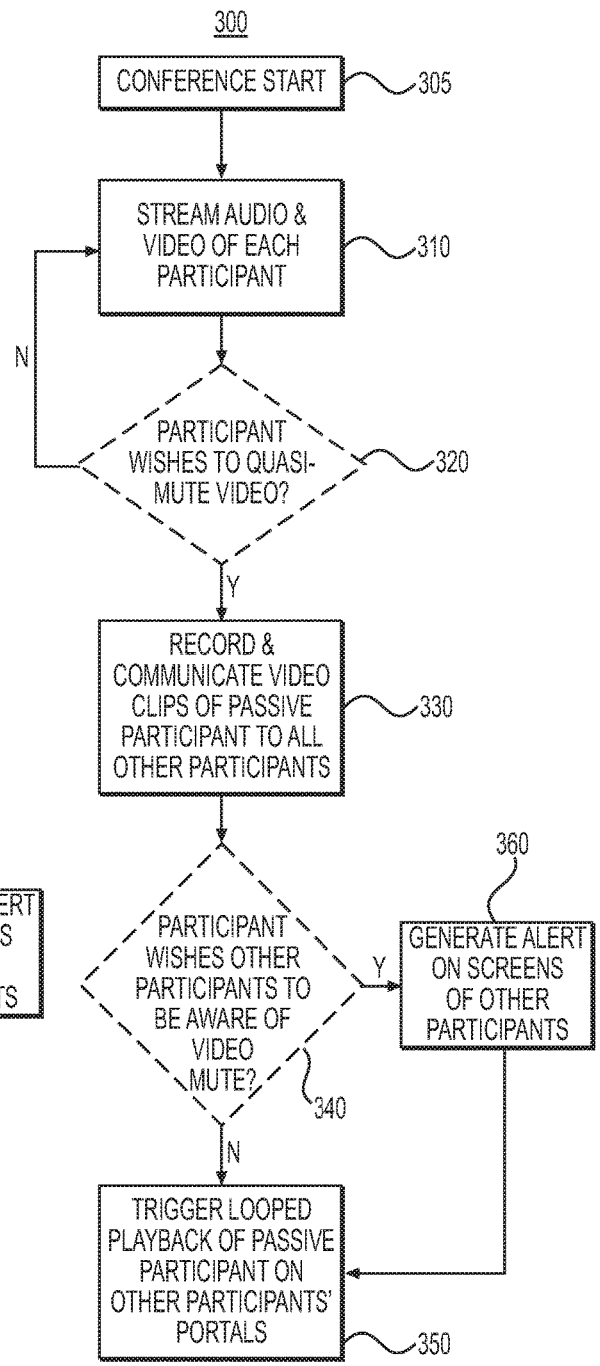

FIGS. 3 and 4 illustrate flowcharts of example methods 200 and 300, respectively, for managing a video conference session. Methods 200 and 300 can be performed by the various devices disclosed above. For example, in some embodiments, methods 200 and 300 are performed by each of portals 14.

Method 200 may be implemented at the start or continuation of a conference session (Step 205). The conference session is started and/or continued, for example, when a conference participant 12 (e.g., participant 12a) opens a corresponding video conferencing software program via portal 14 (e.g., via portal 14a). The conference participant 12 may invite, via the software program, any number of other participants 12 (e.g., participants 12b and 12c) to join the same conference session by providing a link, an electronic invitation, a telephone number, etc., to the other participants 12. The link and/or invitation may be for an immediate conference session or for a future conference session that is scheduled for a particular day and at a particular time. To join the conference session, each participant 12 utilizes input device 20 of their respective portals 14 (e.g., portals 14b and 14c) to touch, press, click, or otherwise activate a corresponding physical or virtual feature (e.g., a button, a window, a link, a checkbox, etc.).

As each participant 12 joins the video conference session, live audio and video streaming of each participant 12 begins (Step 22). Audio and video signals are captured by audio/video device(s) 22 under the direction of the processor of each corresponding portal 14, and streamed in real time to each of the other participants' portals 14. The streaming video is presented on display 18, with the corresponding audio being broadcast via one or more speakers within portal 14. In some embodiments, the audio could additionally or alternatively be converted to text and shown laid over the video on display 18.

In the flowchart of FIG. 3, at the start and/or continuation of each video conference session, a short video clip (e.g., a clip of about 1-3 seconds) of each participant 12 is automatically recorded and communicated to all other participants 12 of the same conference session. In some embodiments, this recording takes place before the real time audio and video streaming takes place (e.g., before step 22) and/or at the same time that the real time audio and video is being streamed. For example, a portion of the live streaming audio and video is recorded and stored within memory as the video clip. The video clip, like the real time streaming audio and video, is captured via audio/video device(s) 22 under the direction of the processor of portal 14 and stored within the memory of portal 14. In addition, the video clip may be communicated to and stored (e.g., stored within a library that is indexed based on an identity of the corresponding participant, a conference number, a conference title, a date, etc.) within the memories of the other portals 14, for example via network 16.

In the disclosed example embodiments, the portal 14 of each corresponding participant makes the recording of the corresponding participant and communicates the recording to all other portals 14 in the manner described above. However, in other example embodiments, each portal 14 could alternatively record incoming video and/or audio signals received from all other portals 14, such that communication of the recording may not be necessary.

At some point during the video conference session, a particular participant 12 may desire to stop the streaming of live audio and/or video signals to the other participants 12, without disrupting the conference session or otherwise distracting the other participants 12. This desire can be indicated, for example, when the particular participant 12 touches, presses, clicks, or otherwise activates a corresponding physical or virtual feature of portal 14. For instance, the particular participant 12 may touch an audio mute button and/or a video quasi-mute button of input device 20, thereby generating corresponding control instructions. In some embodiments, touching one of the audio mute button or the video quasi-mute button results in simultaneous activation of both features. The processor of portal 14 continually monitors for control instructions to determine if the corresponding participant 12 desires the streaming of live audio and/or video to stop (Step 230). The video conference session continues without further control steps being taken, until such input is received (i.e., control may loop through step 230 until the particular participant's input is received).

When the particular participant 12 provides control instruction to quasi-mute the streaming video of themselves, the particular participant 12 is provided with a couple of options. In particular, the particular participant 12 may be able to let others know about the stopping of the real time streaming, or not. In some example embodiments, the particular participant 12 is provided with a way (e.g., via input device 20) to select the corresponding option. The processor of portal 14 monitors for this selection (Step 240), and responds accordingly based on the selection. For example, when the particular participant 12 indicates the desire to quasi-mute the streaming video without making the other participants 12 aware, the processor of the particular participant's portal 14 simply triggers the portals 14 of the other participants 12 to begin playback of the previously recorded and communicated video clip (Step 250). Since the video clip of the particular participant 12 is already stored within the memories of the other portals 14, the playback may be immediate and without signal interference. In addition, the network bandwidth required by the playback of the video clip may be minimal or non-existent.

It is contemplated that the type, size, and/or quality of the video signal played back at step 250 may vary, and be dependent on network and/or portal capabilities at the time of playback. For example, in some instances, network and/or CPU conditions may not allow for communication and/or playback of high-resolution video. In these instances an animation or still image may instead be displayed on portal(s) 14. For these reasons, each portal 14 could be configured to determine its capacity to playback the recorded video signal and proceed accordingly.

Returning to step 240, when the particular participant 12 desires the other participants 12 to be aware of the video quasi-muting, the processor of the particular participant's portal 14 signals the other portals 14 to generate an alert on their corresponding displays (Step 260). The alert may notify the other participants 12 that the video clip is not real time streaming and also that the particular participant 12 may currently be unable to respond to communications.

Method 300 of FIG. 4 may be similar to method 200 described above, with a primary difference being associated with when the video clip is recorded and/or transmitted to the portals 14 of the active participants 12. Specifically, method 300 may begin with steps 305 and 24 that are substantially identical to steps 205 and 22 of method 200 described above. However, in method 300, no video clips are recorded prior to a particular participant 12 indicating (e.g., in a step 320) a desire to quasi-mute their video being streamed to the other participants' portals 14. Step 320 may be followed by a step 330, in which a video clip of only the particular participant 12 is recorded and communicated to the other participants' portals 14. In other words, the input received at step 320 may trigger recording, communication, and playback of the video clip of only the particular participant 12. By recording video clips of only the particular participant 12 and by recording only after the particular participant 12 has provided control instruction to quasi-mute their video, the required bandwidth of network 16 may be reduced even further. A slight delay may occur in this example, however, while the particular participant 12 awaits for recording to be completed and the corresponding video clip to be communicated to the other participants' portals 14 after the particular participant 12 has provided the required control instruction. In some example embodiments, an alert may be provided to the participant being recorded that is indicative of a remaining time in the recording process. For example, the participant being recorded may see a visual alert, with a countdown of how much time the participant will still be required to remain in a recording posture. The remaining steps (i.e., Steps 340, 350, and 360) of method 300 may be substantially identical to steps 240, 250, and 260 of method 200 described above.

In some embodiments, a participant 12 may desire to un-mute their video and resume transmitting live video stream (e.g., after completion of a particular task or return to the conferencing location). Regardless of the process followed to originally mute the live video stream (e.g., regardless of whether method 200 or 300 was previously followed), participant 12 may indicate their desire to un-mute their video by touching, pressing, clicking, or otherwise activating the corresponding physical or virtual feature of portal 14. For instance, the particular participant 12 may touch the video quasi-mute button of input device 20, thereby generating a corresponding second control instruction. The processor of portal 14 continually monitors for the second control instructions to determine if the corresponding participant 12 desires the streaming of live video to resume, and selectively inhibits the video clip from being played back on display 18 of the other participant's portals 14 based on the second control instruction. In addition, the processor of portal 14 selectively resumes transmitting live video stream of the particular participant 12 to portals 14 of the other participants 12 for presentation on displays 18 thereof based on the second control instruction.

Figure 5:
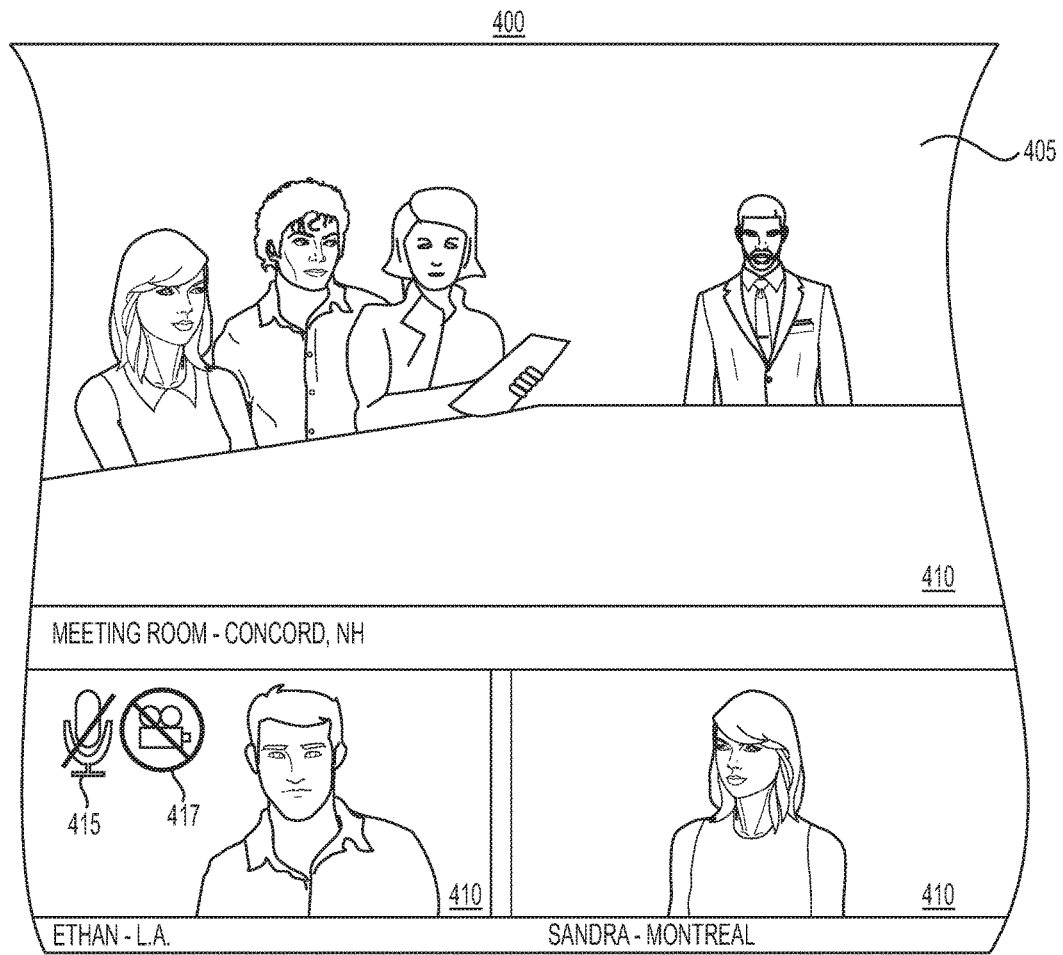
FIG. 5 illustrates an example interface associated with a video conference session, in accordance with the disclosed embodiments.

FIG. 5 shows an example GUI 400, which may be shown on display 18 of an associated portal 14 (referring to FIG. 1) and that includes features corresponding to some of the method steps described above and shown in FIGS. 2 and 3. As can be seen in FIG. 5, GUI 400 includes a main screen 405 that can be divided into any number of sub-screens 32, each sub-screen 32 corresponding to a different participant 12 who is joined into the same video conference session. One of sub-screens 32 (e.g., a lower-left sub-screen 32) corresponds with the participant owner of the particular portal 14. The real time streaming and/or video clip playback described above is shown within each of sub-screens 32.

As also shown in GUI 400, one or more features may be available for selection by the participant 12 (e.g., at steps 230 and 320 described above) to indicate the desire to mute audio and/or quasi-mute real time video streaming. In the disclosed example, these features include a virtual audio mute button 415 and a virtual quasi-mute button 417. It is contemplated that, instead of virtual buttons being laid over sub-screen 32, the virtual buttons could alternatively be located at a perimeter of main screen 405 (e.g., within a tool bar) and/or replaced or supplemented with physical buttons (not shown) on input device 20. It is also contemplated that the same virtual buttons could additionally provide visual indications to the participant 12 of their activation statuses, and/or that dedicated status indicators (not shown) could be provided.

In the preceding description, various preferred embodiments have been described with reference to the accompanying drawings. It will, however, be evident that various modifications and changes may be made thereto, and additional embodiments may be implemented, without departing from the broader scope of the disclosure. The disclosure and drawings are accordingly to be regarded in an illustrative rather than restrictive sense. For example, advantageous results still could be achieved if steps of the disclosed techniques are performed in a different order or if components in the disclosed system were combined in a different manner or replaced or supplemented by other components. Therefore, it is intended that the disclosed embodiments and examples be considered as examples only.

What is claimed is:

1. A first communication portal in a video conferencing session with a second communication portal via a network, the first communication portal being configured to:
   transmit live video stream of a participant to the second communication portal for presentation on a display thereof;
   receive a control instruction from the participant to stop transmitting the live video stream;
   selectively transmit a video clip showing the participant for playback on the display based on the received control instruction;
   receive a second control instruction from the participant to resume transmitting live video stream;
   selectively inhibit the video clip from being played back on the display based on the second control instruction; and
   selectively resume transmitting live video stream of the participant to the second communication portal for presentation on the display thereof based on the second control instruction.

2. The first communication portal of claim 1, wherein the video clip is recorded during transmission of the live video stream.

3. The first communication portal of claim 1, wherein the video clip is recorded prior to transmission of the live video stream.

4. The first communication portal of claim 1, wherein the video clip is recorded responsive to receiving the control instruction.

5. The first communication portal of claim 1, wherein the first communication portal is configured to:
   transmit the video clip to the second communication portal prior to receipt of the control instruction; and
   enable playback of the video clip on the display in response to the control instruction being received.

6. The first communication portal of claim 1, wherein the first communication portal is configured to automatically record the video clip at a start of the video conferencing session.

7. The first communication portal of claim 1, wherein:
   the participant is a first participant;
   the display is a first display;
   the video clip is a first video clip; and
   the first communication portal is further configured to:
      receive from the second communication portal live video stream of a second participant for presentation on a second display associated with the first participant; and
      receive from the second communication portal a video clip showing the second participant for playback on the second display.

8. The first communication portal of claim 1, wherein:
   the participant is a one of a plurality of participants associated with a video conferencing session; and
   the first communication portal is further configured to distribute video clips of each of the plurality of participants to all others of the plurality of participants, for subsequent playback triggered when a corresponding one of the plurality of participants provides a control instruction to stop transmission of live video stream.

9. The first communication portal of claim 1, wherein:
   the first communication portal is further configured to provide a visual indication to the participant that live video stream transmission has stopped; and
   the first communication portal is further configured to provide a visual indication to other participants that live video stream transmission associated with the participant has stopped.

10. The first communication portal of claim 8, wherein:
    the first communication portal is further configured to provide a visual indication to the participant that live video stream transmission has stopped; and
    the first communication portal is configured to provide the visual indication to the other participants only when the participant provides instruction for the first communication portal to provide the visual indication.

11. A computer-implemented method for managing a video conference session, comprising:
    transmitting live video stream of a participant through a communication portal for presentation on a display;
    receiving a control instruction from the participant to stop transmitting live video stream;
    selectively transmitting a video clip showing the participant through the communication portal for playback on the display based on the control instruction;
    receiving a second control instruction from the participant to resume transmitting live video stream;
    selectively inhibiting the video clip from being played back on the display based on the second control instruction; and
    selectively resuming transmitting live video stream of the participant to the second communication portal for presentation on the display thereof based on the second control instruction.

12. The computer-implemented method of claim 11, further including recording the video clip during transmission of the live video stream.

13. The computer-implemented method of claim 11, further including recording the video clip prior to transmission of the live video stream.

14. The computer-implemented method of claim 11, wherein:
    selectively transmitting the video clip includes transmitting the video clip prior to receipt of the control instruction; and
    the playback of the video clip is triggered in response to the control instruction being received.

15. The computer-implemented method of claim 11, further including automatically recording the video clip at a start of a video conferencing session.

16. The computer-implemented method of claim 11, wherein:
    the participant is a first participant;
    the display is a first display;
    the video clip is a first video clip; and
    the computer-implemented method further includes:
       receiving live video stream of a second participant for presentation on a second display associated with the first participant; and
       receiving a video clip showing the second participant for playback on the second display.

17. The computer-implemented method of claim 11, wherein:

the participant is a one of a plurality of participants associated with a video conferencing session; and the computer-implemented method further includes distributing video clips of each of the plurality of participants to all others of the plurality of participants, for subsequent playback triggered when a corresponding one of the plurality of participants provides a control instruction to stop transmission of live video stream.

18. The computer-implemented method of claim 11, further including providing a visual indication to the participant that live video stream transmission has stopped.

19. A non-transitory computer-readable medium encoded with instructions, which when executed by a processor, cause the processor to perform a method for managing a video conference session, comprising:

transmitting live video stream of a participant through a communication portal for presentation on a display;

receiving a control instruction from the participant to stop transmitting the live video stream;

selectively transmitting a video clip showing the participant through the communication portal for playback on the display based on the control instruction, wherein the video clip is recorded during transmission of the live video stream;

receiving a second control instruction from the participant to resume transmitting live video stream;

selectively inhibiting the video clip from being played back on the display based on the second control instruction; and selectively resuming transmitting live video stream of the participant to the second communication portal for presentation on the display thereof based on the second control instruction.

20. The first communication portal of claim 1, wherein the first communication portal is further configured to:

prior to receiving the control instruction, display a first virtual feature associated with an operation of quasi-muting the live video stream; and prior to receiving the second control instruction, display a second virtual feature associated with an operation of un-muting the live video stream.

* * * * *